United States Patent [19]

Liu et al.

[11] Patent Number: 5,510,180
[45] Date of Patent: Apr. 23, 1996

[54] POLYPROPYLENE LAMINATES

[75] Inventors: Yao-Ching Liu, Longview; Ray Edwards, Henderson, both of Tex.

[73] Assignee: Eastman Chemical Company, Kingsport, Tenn.

[21] Appl. No.: 126,213

[22] Filed: Sep. 23, 1993

Related U.S. Application Data

[62] Division of Ser. No. 815,726, Dec. 30, 1991, Pat. No. 5,248,364.

[51] Int. Cl.$^6$ ............ B32B 27/08; B32B 27/36; B29C 47/06
[52] U.S. Cl. ............ 428/332; 428/412; 428/476.1; 428/461; 428/483; 428/516; 428/518; 428/520; 428/910; 156/244.11
[58] Field of Search ............ 428/332, 516, 428/578, 520, 910

[56] References Cited

U.S. PATENT DOCUMENTS

| | | | |
|---|---|---|---|
| 3,862,265 | 1/1975 | Steinkamp et al. | 260/878 R |
| 3,862,266 | 1/1975 | McConnell et al. | 260/878 R |
| 4,799,344 | 1/1989 | Francis | 52/235 |
| 5,112,424 | 5/1992 | Cook | 156/243 |
| 5,248,364 | 9/1993 | Liu et al. | 156/244.11 |
| 5,256,717 | 10/1993 | Stauffer et al. | 524/293 |

*Primary Examiner*—P. C. Sluby
*Attorney, Agent, or Firm*—Mark A. Montgomery

[57] ABSTRACT

A multi-layer laminate containing a layer of a polypropylene material permanently bonded to an imine primed substrate is disclosed. This laminate contains a layer that is a blend of maleated high molecular weight polypropylene/low density polyethylene and a second layer that is substrate, such as nylon, that is primed with an imine primer such as polyethyleneimine.

12 Claims, 2 Drawing Sheets

Run 1

Run 2

Run 3

Run 4

Run 1

Run 2

Run 3

Run 4

POLYPROPYLENE LAMINATES

This is a divisional application of application Ser. No. 07/815,726 filed Dec. 30, 1991 now U.S. Pat No. 5,248,364.

FIELD OF THE INVENTION

The present invention relates to laminates and the process for their production. The laminates have a layer of polypropylene containing material bonded to a substrate such as a non-polar substrate. More particularly, the present invention relates to a method of producing laminates by extrusion coating a layer, a blend of a maleated polypropylene and a low density polyethylene, onto a substrate layer primed with an imine primer.

BACKGROUND OF THE INVENTION

Multi-layered compositions such as permanently bonded laminates are very useful. These multi-layered laminates take advantage of the good properties of each of the individual layers of the laminate. Laminates having good strength, good solvent resistance, good grease resistance and low gas permeability are very desirable and could be formed from a strong layer, a layer that is solvent or grease resistant and a layer that has low gas permeability giving the resulting laminate the desirable overall properties. These laminates have uses in packaging applications such as the packaging of grease covered metallic parts.

Many laminates that are made of independent layers that are destructively bonded together are well known and are generally made of porous substrates and a bonded polymer coating such as a layer of polyethylene bonded to a substrate such as paper. However, laminates using a non-porous substrate such as metal foil or nylon do not generally form permanent bonded layers that are destructive when separated. Thus, these non-porous substrates must be primed with some sort of primer to allow permanent bonding of the polymer to the substrate. Polyethylenes are permanently bonded to non-porous substrates if the substrate is primed with a polyethylene imine primer. Whereas polymers of propylene cannot be bonded to these non-porous substrates without the use of a very unique primer, a chlorinated polypropylene primer. The polypropylene layer in a laminate adds the advantages of excellent grease and solvent-resistance to the laminates, however, producing these polypropylene laminates is expensive due to the cost of the chlorinated polypropylene primer. Additionally, chlorine containing materials are undesirable due to the tendency of forming hydrochloric acid which is very corrosive.

Thus, it would be very desirable to be able to produce inexpensive laminates containing a layer of polypropylene without the use of a chlorinated polypropylene primer.

SUMMARY OF THE INVENTION

The process of the present invention for producing an inseparably bonded polypropylene melt extrusion laminate comprises extruding onto an imine primed substrate a layer of a maleated high molecular weight polypropylene/low density polyethylene blend.

The present invention further comprises an article of manufacture that is a destructively bonded melt extrusion laminate comprised of (1) a first layer of a blend of maleated high molecular weight polypropylene/low density polyethylene; and (2) a second layer of a substrate primed with an imine primer.

DETAILED DESCRIPTION OF THE INVENTION

Applicants have unexpectedly discovered that maleated high molecular weight polypropylene compositions can be inseparably or destructively-bonded to non-porous substrates primed with imine primer. Prior to the present invention, laminates containing a layer of polypropylene on a non-porous substrate were simply not known without the use of a chlorinated polypropylene primer. The laminated film of the present invention has excellent toughness as well as excellent barrier properties against grease, oil, and corrosion, and can be used in various applications such as wrap applications for metal parts (machine parts).

The process of the present invention entails extruding under extrusion coating conditions, a layer that is a blend of maleated high molecular weight polypropylene/low density polyethylene onto a substrate that is primed with an imine primer.

The substrate can be any number of substrates, porous, and non-porous, but is preferably selected from non-porous non-reactive substrates. By non-reactive it is meant that the unprimed substrate generally does not accept the maleated high molecular weight polypropylene/low density polyethylene blend to form a destructive bond, either chemically, by polar interaction, or mechanically. By non-porous it is meant that a substrate does not have pores sufficient to significantly increase the bonding of the coating to the unprimed substrate. Although porous substrates can be used, non-porous substrates are preferred since adhesion to these substrates is most improved by the present invention. The non-porous substrates are preferably selected from polymers of polycarbonate, polyesters, nylons, and metallic foils such as aluminum foil, with nylons and metallic foils being more preferred.

The imine primer used to coat the substrate in the present invention is preferably a polyethyleneimine primer such as Mica A-131-X manufactured by Mica Corporation, USA. It is expected that other polyethyleneimines will function well as primer in this application but Mica A-131-X is the most preferred polyethylene imine primer.

The substrate can be primed with the imine primer by any conventional method of priming such as those methods used for priming substrates with water-based primers. An example of a suitable method of priming the substrate is by spraying.

The substrate is preferably primed well in advance of being subjected to the extrusion coating or extrusion lamination process. The substrate is preferably coated with a solution containing the imine primer followed by drying the substrate. This solution is preferably an aqueous solution containing very little volatile organics. This solution preferably contains between about 3–5 volume % polyethyleneimine and 95–97 volume % water.

Figure 1:
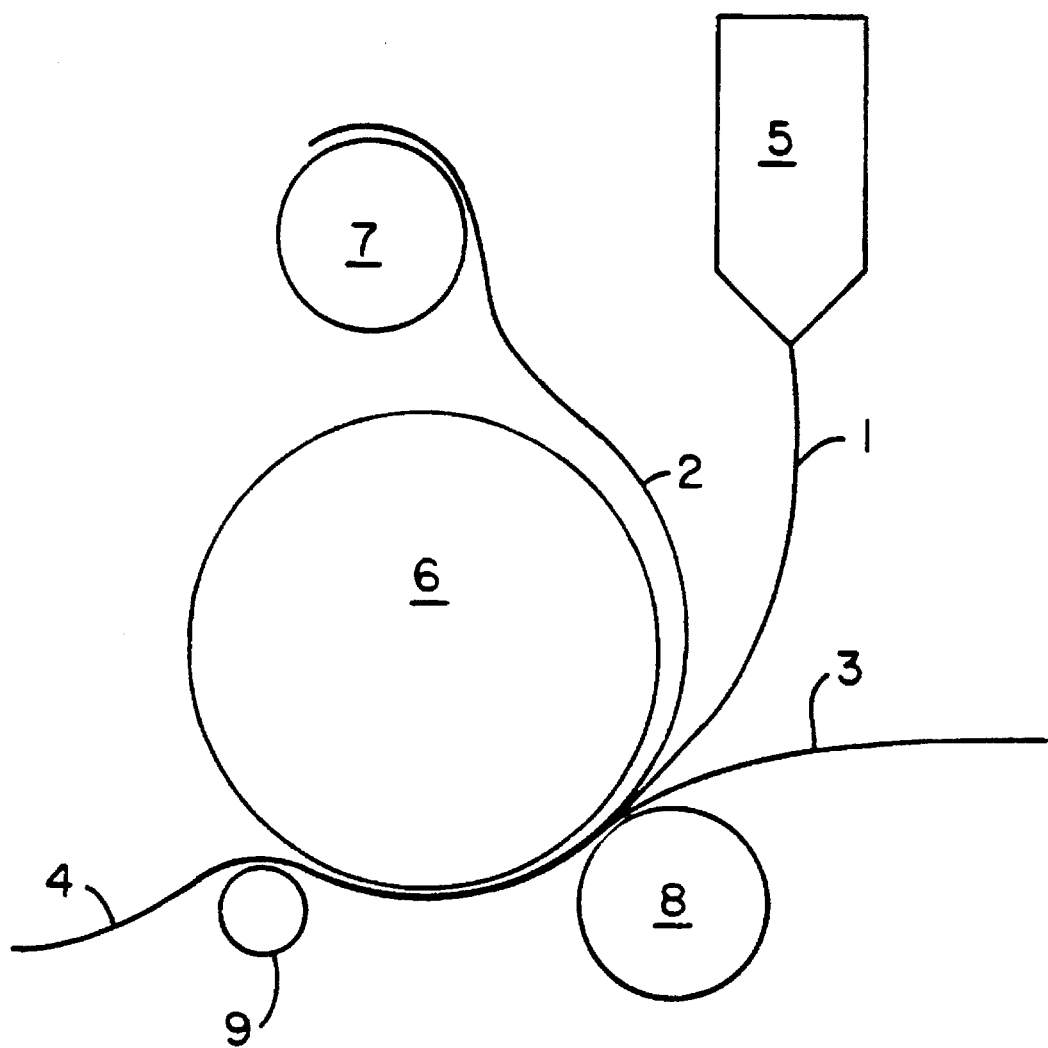
FIG. 1 represents an extrusion lamination process in which the maleated high molecular weight polypropylene/low density polyethylene blend is extruded between a layer of imine primed substrate and polyolefin film.

An example of the extrusion lamination process of the present invention is illustrated in FIG. 1. In this extrusion coating process 1 is the extruded blend layer of maleated high molecular weight polypropylene/low density polyethylene blend, 2 is the imine coated non-porous substrate such as nylon film that is laminated to one side of the maleated high molecular weight polypropylene/low density polyethylene blend layer, and 3 is a third layer of an olefin polymer such as a polypropylene or polyethylene based polymer film or sheet that is laminated with blend layer 1 to non-porous substrate 2 resulting in the laminated film 4. The extrusion die that extrudes the layer of maleated high molecular weight polypropylene/low density polyethylene blend is at 5. The large chilled roll that cools the laminated film is at 6 whereas 7, 8, and 9 are rolls that aid in pressing and advancing the film.

The extrusion coating process of the present invention is preferably conducted at a temperature between 425° F. and 525° F. at a line speed of 200 feet per minute or faster, and at a throughput rate of 5 to 10 pounds per hour per inch of die width with 10 pounds per hour per inch being most preferred.

Any amount of maleated high molecular weight polypropylene would improve the grease resistance of a film, and would improve the adhesion compared to a corresponding amount of non-maleated polypropylene. However, the maleated high molecular weight polypropylene/low density polyethylene blend preferably contains at least 10 weight % maleated high molecular weight polypropylene more preferably at least 30 weight with at least 50 weight % being most preferred. The lower amounts of polypropylene in the blend would impart less of the grease and solvent resistant properties to the layer, and the adhesion of these low polypropylene blends is not as dramatically improved by the present invention. Therefore, the higher amounts of polypropylene are more preferred.

The maleated high molecular weight polypropylene/low density polyethylene blend requires some amount of low density polyethylene to be able to be extrusion coated and preferably contains at least 5 weight % low density polyethylene and no more than 95 weight % maleated high molecular weight polypropylene. At least 5% low density polyethylene imparts adequate extrusion coating capabilities to the blend, however 10–20 weight % low density polyethylene provides better extrusion coating properties. The overall balance of adequate extrusion coating properties and grease resistance are at a most preferred concentration of about 90 weight % maleated high molecular weight polypropylene and about 10 weight % low density polyethylene.

The maleated high molecular weight polypropylene used in the blend of the present invention is generally prepared by taking maleated high molecular weight polypropylene that has been prepared by a conventional process as illustrated in U.S. Pat. Nos. 3,862,266 and 3,862,265. The maleated high molecular weight polypropylene of the blend is preferably maleated to about 0.1–2 weight % maleic anhydride, more preferably about 0.2–1 weight % with about 0.5 weight % maleic anhydride being most preferred. Although the adhesion of the blend is improved by incorporating any amount of maleic anhydride into the high molecular weight polypropylene, at concentrations less than about 0.1 weight % maleic anhydride, the high molecular weight polypropylene does not have an adequate acid number to render the resulting blend destructively bondable to imine prime substrates, whereas amounts much over 2 weight % do not provide any substantial increase in bonding. The maleated high molecular weight polypropylene preferably has an acid number between 1 and 8, more preferably between 2 and 6 with an acid number of about 4 being most preferred.

The high molecular weight polypropylene can be a homopolymer or copolymer containing up to 5 weight % of other monomers without interfering with the overall properties of the polypropylene. The high molecular weight polypropylene preferably has a flow rate between 1 and 20 decigrams per minute at 230° C. more preferably between 2 and 10 decigrams per minute at 230° C. with flow rates between 2 and 5 being most preferred. A flow rate above 20 will produce maleated high molecular weight polypropylenes with flow rates above 70 which means that these maleated high molecular weight polypropylenes are too fluid and do not have a desirable melt strength. Whereas a flow rate below 2 will produce maleated high molecular weight polypropylenes with flow rates below 40 which means that the maleated high molecular weight polypropylenes do not process well. Thus the maleated high molecular weight polypropylene preferably has a flow rate between about 40 and 70 decigrams/min at 230° C. preferably between about 50 and 60 decigrams/min with a flow rate of about 55 decigrams/min being most preferred.

The low density polyethylene used in the blend of the present invention preferably has a poly-dispersity index between 3 and 15. The poly-dispersity index is the ratio of the weight average molecular weight to the number average molecular weight. This poly-dispersity index for the low density polyethylene is more preferably between about 5 and 10 with about 7 being most preferred. A low density polyethylene with a poly-disperity index below about 3 exhibits excessive edge weaving during extrusion coating/lamination, whereas a low density polyethylene with a poly-dispersity index above about 15 exhibits extrudate tear-off during extrusion coating/lamination.

The low density polyethylene also preferably has a melt index between about 1 and 10 decigrams/min at 190° C., more preferably between about 3 and 7 decigrams with a melt index of about 3.5 decigram being most preferred. A low density polyethylene with a melt index below about 1 does not blend well with maleated polypropylenes due to a viscosity mismatch, whereas a low density polyethylene with a melt index above about 10 is less preferred since it does not provide sufficient melt strength needed for this process.

The maleated high molecular weight polypropylene/low density polyethylene blend of the present invention can have other conventional additives incorporated into the blend by conventional methods. Suitable additives include, for example, Irganox 1010 antioxidant.

The blend of the present invention can be blended by any conventional process such as tumble blending.

Corrosion inhibitors are presently added to some polyethylenes at about 0.5% by weight to be made into film for use in laminations for protecting metal parts from oxidation and corrosion. Examples of corrosion-resistant polyethylene films are marketed by Northern Instruments Corporation, Lino Lakes, Minn., U.S.A., as "Zerust" Films. Such films can be used in combination with a film of the maleated high molecular weight polypropylene/low density polyethylene blend of this invention to form laminated structures with the two films destructively bonded together. Corrosion inhibitors at about 0.5% by weight could also be added to polypropylene films and laminated with a film of the blend of the present invention to form a destructively bonded laminate of the two films. Corrosion inhibitors at about 0.5% by weight can also be added directly to the maleated high molecular weight polypropylene/low density polyethylene blend of this invention for direct extrusion coating onto a substrate or for extrusion lamination of a multi-layer structure.

The destructively bonded melt extrusion laminate produced according to the present invention comprises:

(1) a first layer of a blend of maleated high molecular weight polypropylene/low density polyethylene; and (2) a second layer of a substrate primed with an imine primer.

The article manufactured is preferably a co-extrusion that contains a third layer comprised of an olefin polymer that is coated on said first layer, said first layer being between said second layer, and said third layer.

The layer of maleated high molecular weight polypropylene/low density polyethylene blend that is extruded in contact with the imine primed non-reactive substrate preferably has a thickness between about 0.2 and 30 mils (0,005–0.76 mm) more preferably between about 0.5 and 5 mils (0.0127–0,127 mm) with a thickness of about 1–2 mils (0,025–0.05 mm) being most preferred. About 1–2 mils is most preferred because it offers adequate grease proofness to a laminated structure.

The following examples are meant to illustrate the present invention but are not intended to limit the reasonable scope thereof.

EXAMPLES

The following procedures were used to evaluate the examples:

The bond was manually tested to determine if it was destructive, which means that the layers could not be separated without destroying the lamination.

Example 1

Preparation of Maleated Polypropylene. A crystalline polypropylene mixture containing 49 parts by weight (pbw) Tenite polypropylene 423S from Eastman Chemical Company (ECC), 49 pbw Tenite polypropylene 424S from ECC, 1 pbw peroxide, and 1 pbw maleic anhydride was tumble blended in a drum and charged into an extruder with the following extruder conditions:

Barrel Temperatures: 190° C.–240° C.

Die Temperature: 240° C.–250° C.

Melt Pressure: 40–100 psi

Extruder Screw Speed: 125 rpm

Feed Rate: 10 pound/hour

Vacuum(vent): 2 mm Hg

Residence time: 80–120 second

The extruded product was pelletized and analyzed to have a melt flow rate of 50 dg per minute at 230° C. and an acid number of 5.0 mg KOH per gram.

Example 2

The maleated polypropylene from Example 1 (89.85 pbw), 10 pbw Tenite 1550p polyethylene from ECC having a melt index of 3.5 dg per minute, and 0.15 pbw antioxidant were tumble-blended and fed into a twin-screw extruder and pelletized under the same operating conditions as in Example 1. This extruded product was then extruded between a 0.6 mil unprimed nylon film (BCF "Curphane" from Bemis Corporation, U.S.A.) and a 2 mil polyethylene film containing 0.5% wt. Zerust corrosion inhibitor as shown in FIG. 1 and illustrated in Run 1, FIG. 2.

Barrel temperature: 450° F.

Melt Temperature: 465° F.

Line Speed: 200 f/min

Film Thickness: 0.001 in

Substrate: nylon film

No bond was formed between the extruded product and the nylon film, however, a good destructive bond was formed between the polyethylene/Zerust film and the extruded product.

Example 3

Figure 2:
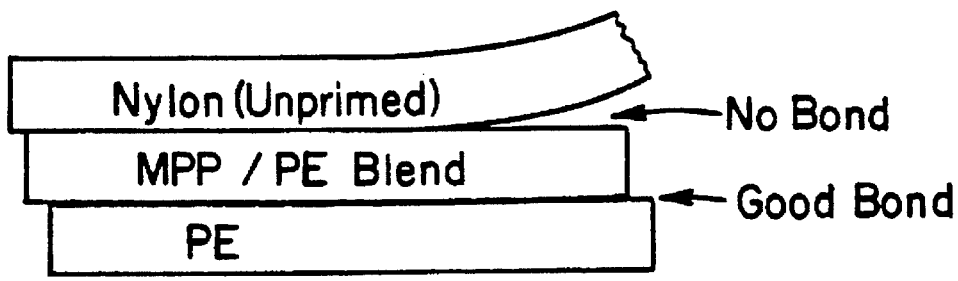
FIG. 2 represents the extrusion laminated articles illustrating the benefit of the present invention in which a maleated high molecular weight polypropylene/ low density polyethylene blend is destructively bonded to imine primed substrates.
Figure 2:
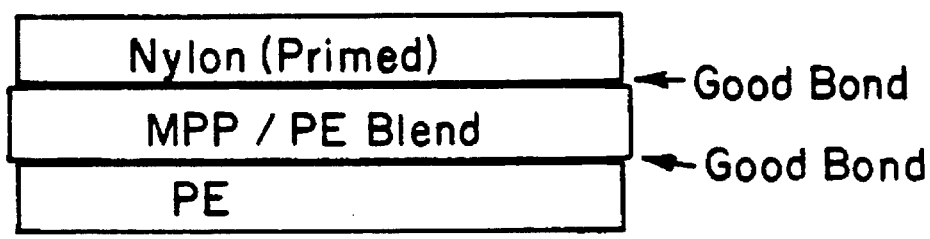
Figure 2:
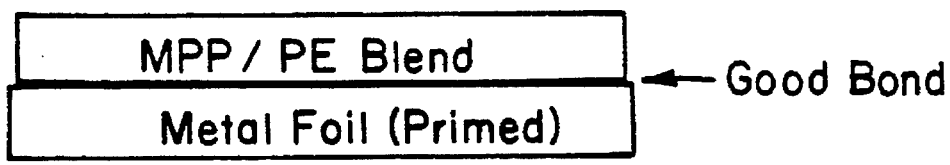
Figure 2:
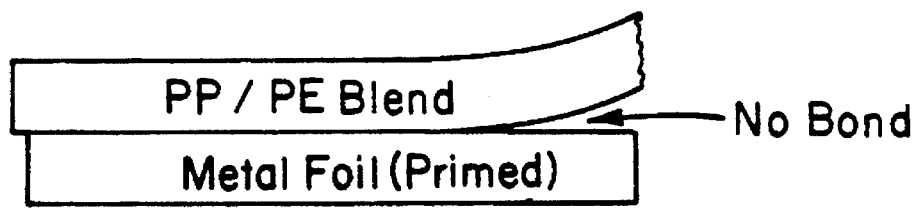

This example was conducted essentially identical to Run 1 in Example 2 above except that, prior to being coated with the extruded product, the nylon film was coated with a commercial aqueous polyethyleneimine primer (MICA A-131-X from MICA Corporation) as shown in Run 2, FIG. 2. Good destructive bonds were obtained from the extruded product with both the primed nylon film and polyethylene/Zerust film.

Example 4

The blend from Example 2 was extruded onto a polyethyleneimine primed metal foil substrate as shown in Run 3, FIG. 3. A good destructive bond was formed between the extruded product and the primed foil.

Example 5

This example was conducted according to Example 4 except that a maleated polypropylene was not included in the extruded blend. The extruded blend (Tenite 4G7DP) contained 80 wt. % Tenite 427S polypropylene and 20 wt. Tenite 1550p polyethylene and is illustrated in Run 4, FIG. 2. No destructive bond was formed between the extruded layer of the nonmaleated polypropylene/low density polyethylene blend and the foil even with the presence of the polyethylene imine primer on the foil substrate.

The invention has been described in detail with particular reference to preferred embodiments thereof, but it will be understood that variations and modifications can be effected within the spirit and scope of the invention.

We claim:

1. A destructively bonded extrusion laminate comprising:
   (1) a first layer of a blend of maleated high molecular weight polypropylene/low density polyethylene; and
   (2) a second layer of a substrate primed with a polyethyleneimine primer.

2. The article of manufacture according to claim 1 wherein said first layer is about 0.2 and 30 mils.

3. The article of manufacture according to claim 2 wherein a third layer comprised of an olefin polymer is coated on said first layer, said first layer being between said second layer and said third layer.

4. The article of manufacture according to claim 3 wherein said olefin polymer of said third layer contains a corrosion inhibitor.

5. The article of manufacture according to claim 1 wherein said blend of said first layer contains a corrosion inhibitor.

6. The article of manufacture according to claim 1 wherein said substrate of said second layer is a non-porous substrate primed with a polyethyleneimine primer.

7. The article of manufacture according to claim 1 wherein said blend of said first layer contains at least 30 weight percent maleated high molecular weight polypropylene.

8. The article of manufacture according to claim 7 wherein said blend contains about 50 to 95 weight percent maleated high molecular weight polypropylene and about 5 to 50 weight percent low density polyethylene.

9. The article of manufacture according to claim 1 wherein said maleated high molecular weight polypropylene of said blend has been maleated with about 0.1 to 2 weight percent maleic anhydride.

10. The article of manufacture according to claim 1 wherein said maleated high molecular weight polypropylene of said blend in said first layer has a melt flow rate of about 40 to 70 decigrams per minute at 230° C.

11. The article of manufacture according to claim 1 wherein said low density polyethylene of said blend in said first layer has a polydispersity index between 3 and 15.

12. The article of manufacture according to claim 1 wherein said low density polyethylene of said blend of said first layer has a melt index between about 1 and 10 decigrams per minute at 190° C.

* * * * *